(12) United States Patent
Barron et al.

(10) Patent No.: US 7,569,199 B1
(45) Date of Patent: Aug. 4, 2009

(54) METHOD TO REMOVE SULFUR OR SULFUR-CONTAINING SPECIES FROM A SOURCE

(75) Inventors: Andrew R. Barron, Houston, TX (US); Christopher E. Coker, Houston, TX (US); John R. Loscutova, Houston, TX (US)

(73) Assignee: Oxane Materials, Inc., Houston, TX (US)

( * ) Notice: Subject to any disclaimer, the term of this patent is extended or adjusted under 35 U.S.C. 154(b) by 159 days.

(21) Appl. No.: 11/801,244

(22) Filed: May 9, 2007

Related U.S. Application Data

(60) Provisional application No. 60/799,129, filed on May 10, 2006.

(51) Int. Cl.
*B01D 53/48* (2006.01)
*C02F 1/58* (2006.01)
*C10L 3/00* (2006.01)
*C10L 3/10* (2006.01)

(52) U.S. Cl. .................. 423/231; 423/244.06; 210/749; 210/758; 210/198.1; 210/916; 208/208 R; 208/244; 48/127.3; 48/127.5; 48/127.7; 44/604

(58) Field of Classification Search ................. 423/231, 423/224.06; 210/749, 758, 198.1, 916; 208/208 R, 208/244; 48/127.3, 127.5, 127.7; 44/604
See application file for complete search history.

(56) References Cited

U.S. PATENT DOCUMENTS

| | | | | | |
|---|---|---|---|---|---|
| 4,311,680 | A | * | 1/1982 | Frech et al. | 423/230 |
| 4,366,131 | A | * | 12/1982 | Fox | 423/231 |
| 4,722,799 | A | * | 2/1988 | Ashbrook et al. | 210/722 |
| 4,895,824 | A | * | 1/1990 | Kim | 502/300 |
| 6,126,911 | A | * | 10/2000 | Scranton, Jr. | 423/230 |
| 6,770,773 | B2 | | 8/2004 | Rose et al. | |
| 2004/0007498 | A1 | * | 1/2004 | Gislason et al. | 208/15 |
| 2005/0205469 | A1 | * | 9/2005 | Klabunde et al. | 208/208 R |

* cited by examiner

*Primary Examiner*—Timothy C Vanoy
(74) *Attorney, Agent, or Firm*—Kilyk & Bowersox, P.L.L.C.

(57) ABSTRACT

High surface area iron oxides that can be ferroxane-derived iron oxides are described, as well as methods of using the same to remove at least a portion of one or more sulfur-containing species from a gas stream or liquid stream.

23 Claims, 3 Drawing Sheets

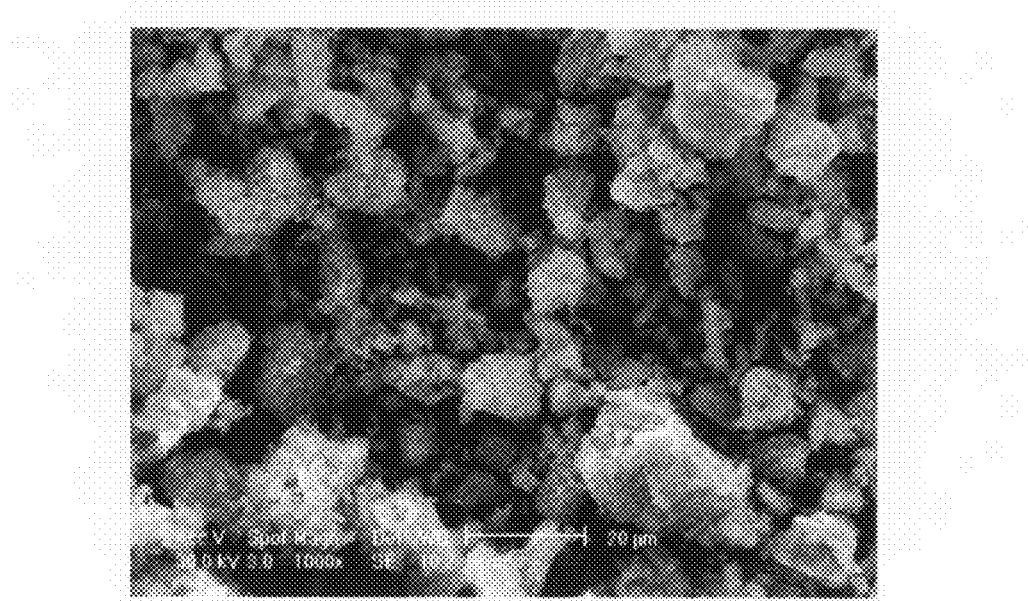
Fig. 1. SEM image of ferroxane derived absorbent before exposure to $H_2S$.
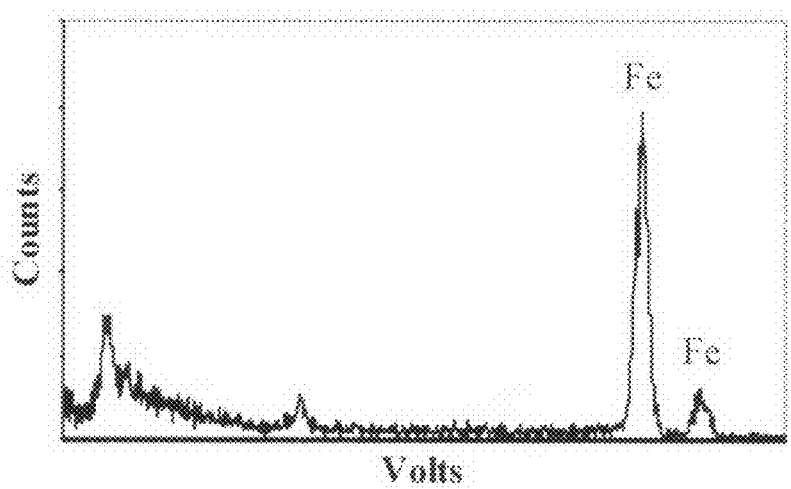
Fig. 2. EDX of ferroxane derived absorbent before exposure to $H_2S$.

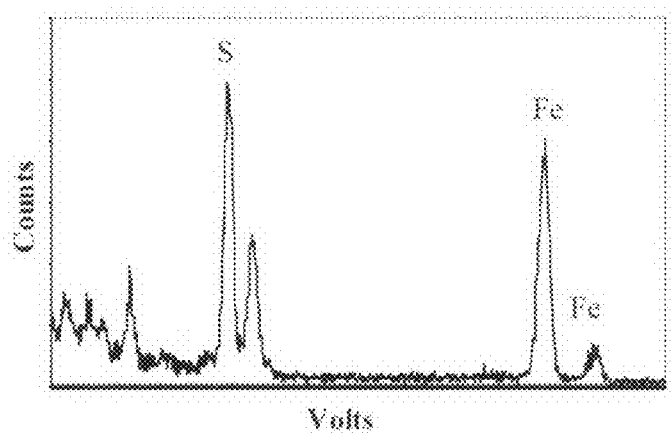
Fig. 3. EDX of ferroxane derived absorbent after exposure to H₂S.
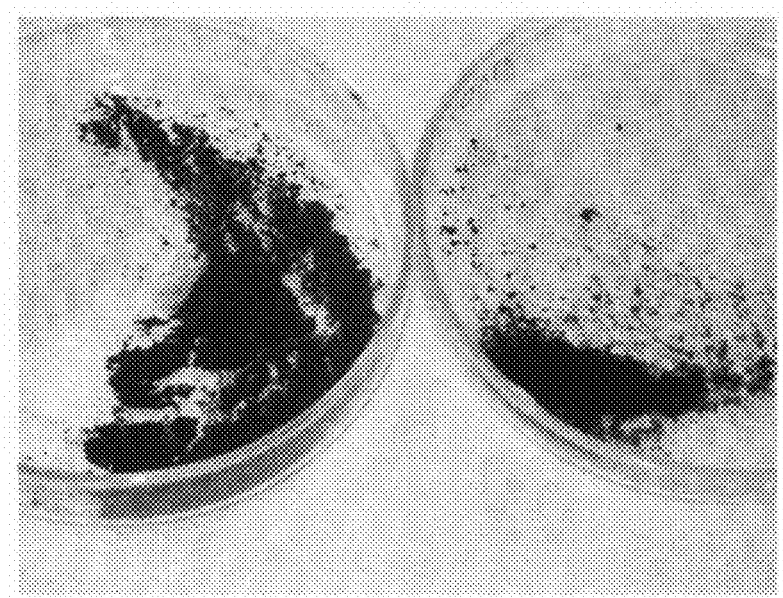
Fig. 4. Photograph of ferroxane derived absorbent before (left) and after (right) exposure to H₂S.

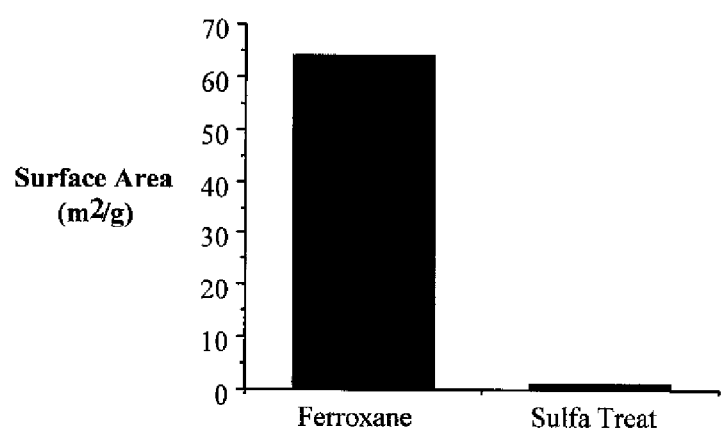
Fig. 5. Relative surface area of absorbents made from ferroxanes versus commercial material.

METHOD TO REMOVE SULFUR OR SULFUR-CONTAINING SPECIES FROM A SOURCE

This application claims the benefit under 35 U.S.C. §119 (e) of prior U.S. Provisional Patent Application No. 60/799,129, filed May 10, 2006, which is incorporated in its entirety by reference herein.

BACKGROUND OF THE INVENTION

The present invention relates to sulfur abatement. The present invention further relates to methods to remove sulfur or sulfur-containing species from various sources, such as a gas stream or liquid stream.

In many applications, it is desirable to reduce the level of gaseous sulfur compounds such as $H_2S$, COS, mercaptans, etc. Many applications, e.g., fuel cells, require that the gaseous sulfur compounds in a raw fuel stream (e.g., naphtha, LPG, town gas, etc.) be reduced to as low a level as practicable in order to avoid poisoning the environment or catalysts such as steam reforming catalysts, water-gas shift catalysts, etc. Furthermore, fuel cell electrodes will rapidly become inactivated as the result of high levels of gaseous sulfur compounds in the fuel stream since the electrodes invariably contain precious metal components, e.g., platinum, which are extremely sensitive to the presence of sulfur compounds.

Also, removal of sulfur compounds from gas streams has been of considerable importance in the past and is even more so today due to environmental considerations. Gas effluent from the combustion of organic materials, such as coal, almost always contain sulfur compounds and sulfur removal processes have concentrated on removing hydrogen sulfide since it has been considered a significant health hazard and because it is corrosive, particularly when water is present. With increasing emphasis on eliminating or minimizing sulfur discharge to the atmosphere, attention is turning to removal of other sulfur compounds from gas streams.

Sulfur contaminants in natural gas streams include hydrogen sulfide, mercaptans, sulfides, and disulfides which due to their odorous nature can be detected at parts per million (ppm) concentration levels. Thus, it is desirable for residential and commercial users of natural gas to have concentrations of mercaptans lowered to 1 ppm and total concentrations of sulfur compounds to 20 ppm or less.

Numerous natural gas wells produce what is called in the industry as "sour gas." "Sour gas" is natural gas that contains hydrogen sulfide, mercaptans, sulfides and disufides in concentrations that make its use unacceptable. Considerable effort has been expended to find an effective and cost efficient means to remove these objectionable sulfur compounds from natural gas.

Transmission companies that purchase natural gas from well owners and then distribute to consumers are very critical of sulfur content and require total sulfur content to be less than 30 ppm. Thus, owners of sour gas wells that exceed the 30 ppm limit are constantly searching for new and more efficient means to make their gas salable.

A number of processes are known for the removal of $H_2S$ from natural gas streams. Processes presently available can be categorized as those based on physical absorption, solid absorption or chemical reaction. Physical absorption processes suffer from the fact that they frequently encounter difficulty in reaching the low concentration of hydrogen sulfide required in the sweetened gas stream. Solid bed absorption processes suffer from the fact that they are generally restricted to low concentrations of $H_2S$ in the entering gas stream. Chemically reacting processes in general may be able to meet sweet gas specifications (primarily $H_2S$ concentrations), however, other reactions may occur with other material present in the gas stream. Above all, the processes presently available do not effectively provide for the removal of mercaptans, sulfides and disulfides.

While iron oxide has been used as an absorbent in the past, the surface area of these prior materials is significantly low such that large amounts of the absorbent need to be used and large amounts of the absorbent remain unexposed to the gas or liquid stream, after uptake at the surface of the absorbent has occurred. Thus, in the past, previous absorbents required large containers for efficient treatment to occur. This has been especially true for the treatment of sour gas.

Accordingly, there is a need to develop materials and methods to address or overcome one or more of the above-identified problems.

SUMMARY OF THE PRESENT INVENTION

A feature of the present invention is to provide methods to remove one or more sulfur-containing species from a gas stream or liquid stream or both.

Another feature of the present invention is to provide a method to remove one or more sulfur-containing species from a source which can operate as a smaller facility.

A further feature of the present invention is to provide a method to remove sulfur-containing species from a source using very high surface area materials.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to remove at least a portion of one or more sulfur-containing species from a source, such as a gas stream or a liquid stream. The method includes contacting the gas stream or liquid stream with a material that at least includes a ferric oxide or iron oxide. The ferric oxide or iron oxide has a high specific surface area, such as 5 $m^2/g$ or higher. The material and more specifically the ferric oxide can have desirable average particle sizes and particle size distribution ranges. The ferric oxide or iron oxide can be a ferroxane derived material.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain the principles of the present invention.

BRIEF DESCRIPTION OF DRAWINGS

FIG. 1 is a SEM image of a ferroxane derived absorbent prior to exposure to a sulfur-containing species such as $H_2S$.

FIG. 2 is a EDX graph of a ferroxane derived absorbent before exposure to a sulfur-containing species such as $H_2S$.

FIG. 3 is a EDX graph of a ferroxane derived absorbent after exposure to a sulfur-containing species such as $H_2S$.

FIG. 4 is a photograph of ferroxane derived iron oxide before (left) and after (right) to exposure with a sulfur-containing species such as $H_2S$.

FIG. 5 is a bar graph showing for one embodiment, the relative surface area of the absorbent of the present invention versus conventional material.

DETAILED DESCRIPTION OF THE PRESENT INVENTION

The present invention relates to a method to remove at least a portion of one or more sulfur-containing species from a gas stream or liquid stream. The method includes at least contacting the gas stream or liquid stream with a material that contains a ferric oxide or iron oxide. The ferric oxide or iron oxide can have a specific surface area of at least 5 $m^2/g$. The specific surface area can be the BET surface area of the material. The material can be entirely the ferric oxide or iron oxide or the material can have other components present along with the ferric oxide or iron oxide. For purposes of the application, the term "ferric oxide" will be used and it is meant to encompass ferric oxide or iron oxide. Ferric oxide can be $Fe_2O_3$ and/or $Fe_3O_4$. The method of the present invention can include other steps before and/or after the step of contacting a gas stream or liquid stream with the material of the present invention.

With respect to the specific surface area, the surface area can be a specific surface area, and with respect to the ferric oxide can be at least 5 $m^2/g$. The specific surface area can be from 5 $m^2/g$ to 80 $m^2/g$ or more. For instance, various specific surface area ranges can include from about 7 $m^2/g$ to about 70 $m^2/g$, or from about 10 $m^2/g$ to about 70 $m^2/g$, or any other ranges within these various ranges. In one or more embodiments, the ferric oxide can have an average particle size of from about 5 microns to about 20 microns, or from about 10 microns to about 15 microns, or from about 7 microns to about 15 microns, or other average particle size ranges.

As an option, in one or more embodiments, the ferric oxide used in the present invention can have various desirable particle size distribution ranges. For instance, 90% of the ferric oxide can have a particle size distribution range of from about 1 micron to about 40 microns or from about 1 micron to about 30 microns. This particle size distribution range can be at least 90%, at least 95%, at least 97%, or at least 99%. Further, the particle size distribution range referenced herein can be less than 90%, such as 75% or more. As an option, at least 40% of the particle sizes of the ferric oxide can have a particle of 5 microns or less, such as from about 1 micron to about 5 microns, wherein this percentage can be from about 10% to about 40% or from about 20% to about 40%.

As stated, in the methods of the present invention, a gas stream can be purified to remove a portion of one or more sulfur-containing species. Examples of gas streams that can benefit from the present invention include, but are not limited to, any gas stream having one or more sulfur-containing species where it is desirable to remove one or more sulfur-containing species or at least reduce the amount of one or more sulfur-containing species present in the gas. Specific examples include, but are not limited to, natural gas, synthesis gas, methane, propane, coal gas, or any combination thereof. Further, as stated, liquid streams can also benefit from the present invention wherein at least a portion of one or more sulfur-containing species can be removed through the methods of the present invention. Examples of liquid streams are any liquid stream containing one or more sulfur-containing species where it is desirable to remove at least a portion of one or more sulfur-containing species from the liquid stream. More specific examples of liquid streams include, but are not limited to, hydrocarbons, gasoline, diesel fuel, water, such as waste water, and the like.

The term "sulfur" denotes sulfur in any form such as elemental sulfur or a sulfur compound. Examples of sulfur include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkydibenzothiophenes, and the like and any combinations thereof, as well as the heavier molecular weights of same which are normally present in a diesel fuel, wherein each R can be an alkyl or cycloalkyl or aryl group containing one carbon atom to ten carbon atoms. Other examples of sulfur-containing species include, but are not limited to, $H_2S$, a thiol, a thiolfuran, $SO_X$, a sulfide, a disulfide, an organic sulfur compound, or any combinations thereof. In the present invention, one or more sulfur-containing species can be removed or at least a portion of one or more sulfur-containing species can be removed by the methods of the present invention. For instance, at least 10% by weight or by volume of the one or more sulfur-containing species can be removed from the gas stream or liquid stream through the methods of the present invention. More preferably, at least 25%, at least 50%, at least 75%, at least 85%, or at least 95%, or 99% or 99.5% or 99.9% by weight or by volume of one or more sulfur-containing species can be removed from the gas stream or liquid stream, wherein these percents are based upon the by weight or by volume of the sulfur-containing species present prior to contacting the gas stream or liquid stream with the material of the present invention.

Put another way, elemental sulfur content present in a gas stream or liquid stream after subjecting the gas stream or liquid stream through the material of the present invention can have a sulfur impurity level of less than 100 ppm, preferably less than 50 ppm, less than 10 ppm, less than 1 ppm, or less than 100 ppb present in the gas stream or liquid stream.

In one or more embodiments, the ferric oxide can be a ferric oxide which is a ferroxane-derived ferric oxide, such as a ferroxane-derived $Fe_2O_3$, a ferroxane-derived $Fe_3O_4$, or a ferroxane-derived $Fe_2O_3$ with $Fe_3O_4$.

The ferroxane that can be used in the present invention can be the ferroxane described in U.S. Pat. No. 6,770,773, which is incorporated in its entirety by reference herein. The ferroxanes may be doped with at least one other element other than iron. The ferroxane can have a general formula $Fe(O)_a(OH)_b(X)_c$ wherein a, b, and c can be any integer or fraction, such as from above 0 to 3 or more (or fractions thereof). The X is a chemically reactive substituent, such as an organic group or inorganic group. The ferroxane may be defined by the formula: $[Fe(O)_x(OH)_y(O_2CR)_z]_n$ wherein x, y and z may be any integer or fraction, such as from above 0 to about 3 (or fractions thereof), such that, for instance, $2x+y+z=3$ and n may be any positive integer. For instance, x can be 0 to 1.5, y can be 0 to 3, z can be 0 to 3, and n can be 1 to 6 or greater. R is hydrogen or an organic group. The organic group can be an alkyl, alkenyl, aromatic, haloalkyl, haloalkenyl, haloaromatic group or alkyl, alkenyl, aromatic ether group or an organic group containing a hetero-atom including, oxygen, nitrogen, sulfur, or phosphorous. The chemically reactive substituent can be a hydroxyl, amine, acrylate, vinyl, olefin, or similar chemical substituent. The ferroxanes can be heated or heat treated to convert them to the high surface area iron oxides in the present invention. The heat treatment can be any temperature sufficient to convert them to the iron oxides or ferric oxides, such as from about 150° C. to about 500° C. for 20 to 120 minutes wherein the temperature is with reference to the temperature of the oven or other device used to heat treat.

In one or more embodiments, the material used in the present invention can be located on a fixed support or a non-fixed support, such as a free support. For instance, the ferric oxide can be present on a substrate, such as a ceramic honeycomb type monolith, carrier mesh, or planar surface, or the ferric oxide can be present on particulates, such as large particulates, wherein the ferric oxide is essentially coating the plurality of supports or substrates. Examples of such supports include, but are not limited to, fly ash, cenospheres, and macrolyte. The material used in the method of the present invention can be present as one or more beds of material wherein the gas stream or liquid stream passes through the bed(s). These beds of material can be present in one or more vessels, such as towers, wherein the gas stream or liquid stream pass through.

In one or more embodiments, the method of the present invention can use the material as a static bed or a fluidized bed. A fluidized bed can, in at least certain situations, allow for more uniform exposure of the sulfur-containing species and thus provide a more efficient removal of one or more sulfur-containing species. Also, in a fluidized bed, it can be easier to change or remove the spent material as it is consumed. This can even be done on a continuous basis if desired.

In one or more embodiments of the present invention, the ferric oxide absorbs at least a portion of one or more sulfur-containing species. This can be done through reacting with one or more sulfur-containing species, such that the one or more sulfur-containing species is retained on the material.

In one or more embodiments of the present invention, the material which can be ferric oxide alone in one or more embodiments, can be removed once it is spent or it can be regenerated by subjecting the material to regenerative processes, such as introducing (e.g., injecting) water, air, and/or oxygen through the material to regenerate it.

The methods of the present invention can be preformed batchwise, continuously, or semi-continuously. In one or more embodiments, an inert carrier that has been impregnated with the ferric oxide or otherwise can hold the iron oxide.

In one or more embodiments, at least two or more containers or vessels containing the absorbent material of the present invention can be used wherein one of these vessels can be used in an alternative fashion to provide for continuous operation of the purifying of the gas stream or liquid stream. For instance, in one embodiment and for exemplary purposes only, a sour gas can enter the top of the bed and flow downward contacting the iron oxide and then sweetened gas can be removed from the bottom of the vessel. The vessel optionally not in operation, when two or more vessels are used, can be shut down for removal or regeneration of the exhausted iron oxide.

The iron oxide process can be operated on a batch basis or continuously, the difference depending upon the technique used for regeneration. When a batch process is used the tower is operated until the bed becomes saturated with sulfur and $H_2S$ begins to appear in the sweetened gas stream. At this point the tower is removed from sweetening service and regenerated by circulating gas containing a small amount of air through the bed. Oxygen concentration of the regeneration stream is normally held below 3 percent because of the highly exothermic nature of the regeneration reaction. In continuous service a small concentration of oxygen may be added to the "sour gas" before entry to the bed. The oxygen in the air reacts with iron sulfide previously formed to regenerate it at the same time ferric oxide is reacting with $H_2S$ in the gas. Each system has advantages and disadvantages and the choice between batch regeneration and continuous regeneration is based on economic factors which differ from installation to installation.

Theoretically, one pound of ferric oxide will react with 0.65 lbs. of hydrogen sulfide. In field operation, this level is never reached. Generally, at 80-85% of theory, $H_2S$ will begin to break through and show up in the gas stream. At this point the bed is shut down and regenerated. For continuous regeneration, for instance, about 2.5 lbs of sulfur may be removed per pound of iron oxide before the oxide may be replaced or regenerated.

The present invention can be used with conventional sulfur scrubbing techniques. These conventional methods can be incorporated before and/or after the methods of the present invention.

Because of the very high surface area material used in the methods of the present invention, significant benefits can be achieved including a decrease in the size of vessels needed to achieve the sulfur removal, a decrease in the time for processing, and/or a decrease in the amount of material/waste employed/produced.

With the use of the present invention, smaller treatment facilities are possible and further, smaller treatment facilities allow for the movement of the treatment facility closer to the source of the raw gas stream or liquid stream containing the undesirable sulfur content, such as a well head, rather than the refinery or gathering facility. Further, the ability of the treatment facility to be located closer to the source of the raw gas stream or liquid stream has further advantages from the standpoint that the gas stream or liquid stream can be treated prior to its transport through pipes, thus limiting corrosion and subsequent maintenance costs. Further, the methods of the present invention can have particular importance to offshore facilities or other facilities where space concerns are of great importance.

With the high surface area material of the present invention, the mass (weight) of the absorbent needed to treat a specific amount of a gas stream or liquid stream is decreased. This has beneficial value with respect to lowering the cost, as well as enhancing the rate of reaction since the rate of reaction of a sulfur compound with a iron oxide surface is related to the surface area of the absorbent. Further, the surface area is a measure of how much absorbent is available for reaction per unit mass. Thus, a further advantage of the high surface area absorbent of the present invention and its method of use is that the time of a raw gas stream or raw liquid stream has to remain exposed to the absorbent to ensure complete reaction is less than for a low surface area absorbent. Thus, the present invention provides multiple advantages over conventional systems.

The present invention, besides relating to a method of removing at least a portion of one or more sulfur-containing species further relates to an apparatus or abatement system which includes one or more vessels containing the absorbent material of the present invention and which has an arrangement such that the vessels are in communication with a liquid stream or gas stream which is in need of the removal of at least a portion of one or more sulfur-containing species.

The present invention will be further clarified by the following examples, which are intended to be exemplary of the present invention.

EXAMPLES

A batch of ferroxane-derived absorbent was synthesized from lepidocrocite mineral, by peptization with acetic acid at room temperature (e.g., about 25° C.). 23.86 g of hydrated ferrous chloride was added to 2 L of a 0.1 M solution and stirred overnight. After centrifugation, the solid lepidocrocite was collected, and 2.53 g of lepidocrocite was mixed with 100 mL of glacial AcOH and stirred at 60° C. in a drying oven. After sufficient reaction, the acidified mineral mixture diluted with 700 mL of water and centrifuged, to remove undispersed mineral from the ferroxane solution. The supernatant was then evaporated to precipitate ferroxane product as a powder. The powder was then fired at 300° C. to produce fine-grained absorbent powder, which is illustrated in FIG. 1. In one experiment, 0.1550 g of absorbent powder was sealed into a Schlenk flask, and evacuated at room temperature. Following introduction of neat $H_2S$ gas and subsequent reaction, a wet black powder was produced, weighing 0.1757 g, which upon baking to a dry powder, yielded 0.1640 g of a dry, black powder. FIG. 4 illustrates the absorbent powder before and after reaction with $H_2S$ gas. Energy dispersive X-ray analysis (EDX) confirmed absorption of $H_2S$ by the powder, and is shown in FIGS. 2 and 3. Surface area of the absorbent was characterized by BET analysis, and was measured to be approximately 64 $m^2$/g absorbent, as shown in FIG. 5.

As an option, the absorbent powder can be coated onto a template scaffolding and packed into a column, and can involve coating 20 g of Sphere One S™ Template with 80 g of a 15% wt solution of dispersed ferroxane absorbent in a fluidized bed. Firing in a kiln to 300° C. and subsequent packing into a column can be performed, where the column can be set up to flow $H_2S$ containing gas through the bed packing of the coated templates, thus allowing for extraction of the $H_2S$ gas from the parent gas and subsequent collection onto the coated absorbent.

An an option, the absorbent can be coated onto the template scaffolding, as exemplified above, and can be placed into a fluidized bed, where the flow of $H_2S$ containing gas is used to fluidize the absorbent, and thereby enhance mixing with the absorbent. As the absorbent becomes spent and gains weight, it can settle lower in the fluidized bed, and can be extracted from the bed, while more fresh absorbent material is added at the top. As water vapor is generated from the reaction, it can be evaporated by the fluidizing gas, and can be collected with a condenser placed downstream in the flow of the now-desulfurized gas.

As an option, the absorbent material itself (without the template scaffolding) can be introduced into the bed and fluidized by the $H_2S$ containing gas, in like manner as exemplified above, and collected as it becomes spent at the bottom of the bed.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to remove at least a portion of one or more sulfur-containing species from a gas stream or liquid stream comprising contacting said gas stream or liquid stream with an iron oxide comprising ferroxane-derived crystalline $Fe_2O_3$ having a specific surface area of 10 $m^2$/g or greater, and wherein said at least a portion of one or more sulfur-containing species is retained on said ferroxane-derived crystalline $Fe_2O_3$.

2. The method of claim 1, wherein said specific surface area is from about 10 $m^2$/g to about 80 $m^2$/g.

3. The method of claim 1, wherein said iron oxide has an average particle size of from about 5 microns to about 20 microns.

4. The method of claim 1, wherein said iron oxide has an average particle size of from about 10 microns to about 15 microns.

5. The method of claim 1, wherein said iron oxide has an average particle size of from about 7 microns to about 15 microns.

6. The method of claim 1, wherein said iron oxide has particle sizes and wherein at least 90% of said particle sizes are in a range of from about 1 micron to about 40 microns.

7. The method of claim 1, wherein said iron oxide has particle sizes and wherein at least 90% of said particle sizes are in a range of from about 1 micron to about 30 microns.

8. The method of claim 1, wherein at least one or more sulfur-containing species are removed from a gas stream and said gas stream comprises natural gas, synthesis gas, methane, coal gas, propane, or any combinations thereof.

9. The method of claim 1, wherein one or more sulfur-containing species are removed from a liquid stream, wherein said liquid stream is a hydrocarbon stream.

10. The method of claim 1, wherein one or more sulfur-containing species are removed from a liquid stream, wherein said liquid stream is gasoline or diesel fuel.

11. The method of claim 1, wherein one or more sulfur-containing species are removed from a liquid stream, wherein said liquid stream is water.

12. The method of claim 1, wherein said iron oxide is on at least one support.

13. The method of claim 12, wherein said support is a fixed support.

14. The method of claim 12, wherein said support is a template scaffolding.

15. The method of claim 1, wherein said material is present as a bed of material.

16. The method of claim 12, wherein said support is a plurality of supports.

17. The method of claim 1, wherein said method is conducted in at least two vessels, wherein said vessels are alternatively operated.

18. The method of claim 1, wherein said sulfur-containing species comprises $H_2S$.

19. The method of claim 1, wherein said sulfur-containing species comprises $H_2S$, a thiol, a thiolfuran, or any combination thereof.

20. The method of claim 1, wherein said sulfur-containing species comprises $SO_x$, a sulfite, a disulfite, an organic sulfur compound, or any combination thereof.

21. The method of claim 1, further comprising converting a ferroxane to a ferric oxide prior to contacting said gas stream or liquid stream with said ferric oxide.

22. The method of claim 21, wherein said ferroxane has a formula $Fe(O)_a(OH)_b(X)_c$ wherein X is a chemically reactive substituent, and a, b, and c are positive integers or fractions in the range of from 0 to 3.

23. The method of claim 21, wherein said ferroxane is converted to a ferric oxide by heat treating the ferroxane.

* * * * *